US010921432B2

(12) United States Patent
Barbello et al.

(10) Patent No.: US 10,921,432 B2
(45) Date of Patent: *Feb. 16, 2021

(54) SEAMLESS AUTHENTICATION USING RADAR

(71) Applicant: Google LLC, Mountain View, CA (US)

(72) Inventors: Brandon Barbello, Mountain View, CA (US); Leonardo Giusti, San Francisco, CA (US); Ivan Poupyrev, Sunnyvale, CA (US); Eiji Hayashi, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,264

(22) Filed: Jun. 4, 2020

(65) Prior Publication Data

US 2020/0300998 A1 Sep. 24, 2020

Related U.S. Application Data

(63) Continuation of application No. 15/844,229, filed on Dec. 15, 2017, now Pat. No. 10,725,161.

(51) Int. Cl.
*G01S 13/04* (2006.01)
*G06K 9/62* (2006.01)
(Continued)

(52) U.S. Cl.
CPC .............. *G01S 13/04* (2013.01); *G01S 7/412* (2013.01); *G06F 3/017* (2013.01); *G06F 21/31* (2013.01); *G06F 21/32* (2013.01); *G06K 9/00342* (2013.01); *G06K 9/00369* (2013.01); *G06K 9/00523* (2013.01); *G06K 9/6201* (2013.01);

(Continued)

(58) Field of Classification Search
CPC ...................................................... G01S 13/04
See application file for complete search history.

(56) References Cited

U.S. PATENT DOCUMENTS

| 7,356,706 B2 * | 4/2008 | Scheurich ............. H04W 12/06 |
| | | 713/186 |
| 10,725,161 B2 | 7/2020 | Barbello et al. |
| | (Continued) | |

FOREIGN PATENT DOCUMENTS

WO 2019118017 6/2019

OTHER PUBLICATIONS

"EP Appeal Decision", European Application No. 10194359.5, May 28, 2019, 20 pages.

(Continued)

*Primary Examiner* — Simon P Kanaan
(74) *Attorney, Agent, or Firm* — Colby Nipper (57) ABSTRACT

Techniques and devices for seamless authentication using radar are described. In some implementations, a radar field is provided through a radar-based authentication system. The radar-based authentication system can sense reflections from an object in the radar field and analyze the reflections to determine whether the object is a person. In response to determining that the object is a person, the radar-based authentication system can sense an identifying characteristic associated with the person. Based on the identifying characteristic, the radar-based authentication system can determine that the person is an authorized user.

20 Claims, 7 Drawing Sheets

(51) Int. Cl.
  *G06K 9/00* (2006.01)
  *G06F 21/32* (2013.01)
  *G01S 7/41* (2006.01)
  *G06F 3/01* (2006.01)
  *G06F 21/31* (2013.01)
  *H04W 12/06* (2021.01)
  *G01S 13/88* (2006.01)
  *H04L 29/06* (2006.01)

(52) U.S. Cl.
  CPC .............. *H04W 12/06* (2013.01); *G01S 7/41* (2013.01); *G01S 13/88* (2013.01); *H04L 63/0861* (2013.01)

(56) References Cited

U.S. PATENT DOCUMENTS

| | | | |
|---|---|---|---|
| 2010/0205667 A1 | 8/2010 | Anderson et al. | |
| 2013/0173926 A1 | 7/2013 | Morese et al. | |
| 2015/0288688 A1 | 10/2015 | Derakhshani | |
| 2016/0048672 A1* | 2/2016 | Lux | H04W 12/0605 340/5.82 |
| 2016/0054803 A1 | 2/2016 | Poupyrev | |
| 2017/0097413 A1 | 4/2017 | Gillian et al. | |
| 2019/0187265 A1 | 6/2019 | Barbello et al. | |

OTHER PUBLICATIONS

"Galaxy S4 Air Gesture", Galaxy S4 Guides, retrieved from: https://allaboutgalaxys4.com/galaxy-s4-features-explained/air-gesture/ on Sep. 3, 2019, 4 pages.

"International Search Report and Written Opinion", PCT Application No. PCT/US2018/048851, dated Nov. 15, 2018, 16 pages.

"Non-Final Office Action", U.S. Appl. No. 15/844,229, dated Oct. 21, 2019, 10 Pages.

"Notice of Allowance", U.S. Appl. No. 15/844,229, dated Apr. 3, 2020, 5 Pages.

"Samsung Galaxy S4 Air Gestures", Video retrieved from https://www.youtube.com/watch?v=375Hb87yGcg, May 7, 2013, 4 pages.

Geisheimer, et al., "A Continuous-Wave (CW) Radar for Gait Analysis", IEEE 2001, 2001, 5 pages.

"International Preliminary Report on Patentability", Application No. PCT/US2018/048851, dated Jun. 25, 2020, 9 pages.

* cited by examiner

SEAMLESS AUTHENTICATION USING RADAR

RELATED APPLICATION

This application claims priority to and is a continuation application of U.S. patent application Ser. No. 15/844,229, filed on Dec. 15, 2017, which is incorporated herein by reference in its entirety.

BACKGROUND

Electronic devices are used for communication, as storage for information and photographs, and to conduct business and financial transactions. Because of the wide range of uses, the power required to keep a screen illuminated, and the amount of information stored on the electronic devices, many electronic devices turn off the screen and lock themselves after some time period without active user interaction or based on some other criteria. Once the electronic device is locked, typically only an authorized user can unlock and access the device. Electronic devices therefore also typically include technology that allows the device to authenticate a user (e.g., determine that the user is an authorized user) before granting the user access to the device.

Depending on how long the user accesses the device per session or how often the user interacts with the device, users may have to be authenticated multiple times each day (according to some studies, typical users access their electronic devices more than 50 times per day). Often, authentication requires the user to perform a particular interaction on a touchscreen, remember and enter a complicated password, or hold a finger against a sensor long enough for the device to detect a fingerprint.

SUMMARY

This document describes techniques and systems that enable seamless authentication using radar. The techniques and systems can use a radar field to accurately and automatically authenticate a user of an electronic device when the user approaches. The authentication is implicit and seamless—the user does not have to actively or explicitly perform the authentication. Instead, the techniques and systems use the radar field to enable the electronic device to sense when an object approaches and determine whether the object is a person. If the object is determined to be a person, the techniques and systems allow the device to use the radar field, or other sensors, to authenticate the user and determine that the user is an authorized user of the device.

Additionally, the techniques and systems can enable the device to maintain the authentication while the authorized user is engaged with the device, even when the authorized user is not actively interacting with the device, such as reading or listening to audio. Further, the techniques and systems can also enable the device to seamlessly de-authenticate or lock the device when the user leaves the area or, optionally, when another person approaches.

This summary is provided to introduce simplified concepts concerning seamless authentication using radar, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of seamless authentication using radar are described in this document with reference to the following drawings. The same numbers are used throughout the drawings to reference like features and components.

DETAILED DESCRIPTION

Overview

This document describes techniques for using, and systems for enabling, seamless authentication using radar. The techniques and systems can provide seamless and automatic authentication of authorized users for devices including mobile phones, tablet computers, desktop computers, smart televisions, and so forth. Using a radar-based authentication system, the systems and techniques enable devices to sense a person in the area of the device. Once a person is determined to be near the device, the techniques and systems are capable of using radar or other sensors to authenticate the user and grant access to the device, without active and explicit input from the person. The techniques thereby improve the user's efficiency, work flow, and enjoyment by reducing the number of times a password or other authentication method must be performed.

Consider, for example, an electronic device that includes multiple applications for both work and personal use. In this example, the electronic device may include multiple systems for authenticating a user so that only an authorized user can access the device. Conventional authentication techniques typically dictate that the user must explicitly interact with the device. For example, the user may enter a password via a keypad, draw a symbol on a touchscreen, or answer an authentication question. Further, once the user is authenticated, the conventional authentication system often de-authenticates the user, and locks the device, if the authorized user does not actively engage the device for a period of time, even if the user is still passively engaged with the device (e.g., reading, studying an image, or thinking about the next step in a game). The authorized user must then repeat the authentication steps to continue using the device. The authorized user may also intentionally de-authenticate by locking or logging out of the electronic device, for example, to answer a phone call or when other people enter the room. When the interruption is over, the user will have to be re-authenticated. Repeated de-authentication and re-entering of credentials can disrupt the user's work flow or game play, reducing the user's efficiency and the quality of the user's experience with the device and applications.

Contrast these conventional techniques for authentication with the systems and techniques described in this document, which can improve efficiency and usability in several areas. For example, the electronic device may include one or more radar sensors that can provide a radar field that extends into an area around the device (e.g., a five- or eight-foot radius around the device). The radar sensors can use radar signals reflected from objects that enter the radar field to determine when a person comes within the radius of the device. The device can then automatically authenticate the person by using radar (or other sensors, such as a camera) to identify the person and determine whether the person is an authorized user. Similarly, the radar sensors can be used to determine when the user leaves the area, enabling the device to be automatically locked.

The described techniques and systems allow the authentication process to become seamless and automatic from the user's perspective. The user has access upon approaching the device and the device is secured when the user leaves the area. This can improve work flow and productivity, and reduce user interventions (entering passwords), which increases the quality of the user experience. Further, because de-authentication is also automatic, there is less risk that the user will forget to lock the device.

These are but a few examples of how the techniques and devices described herein may be used to seamlessly authenticate users. Other examples and implementations of which are described throughout this document. The document now turns to an example environment, after which example apparatuses, methods, and components are described.

Operating Environment

Figure 1:
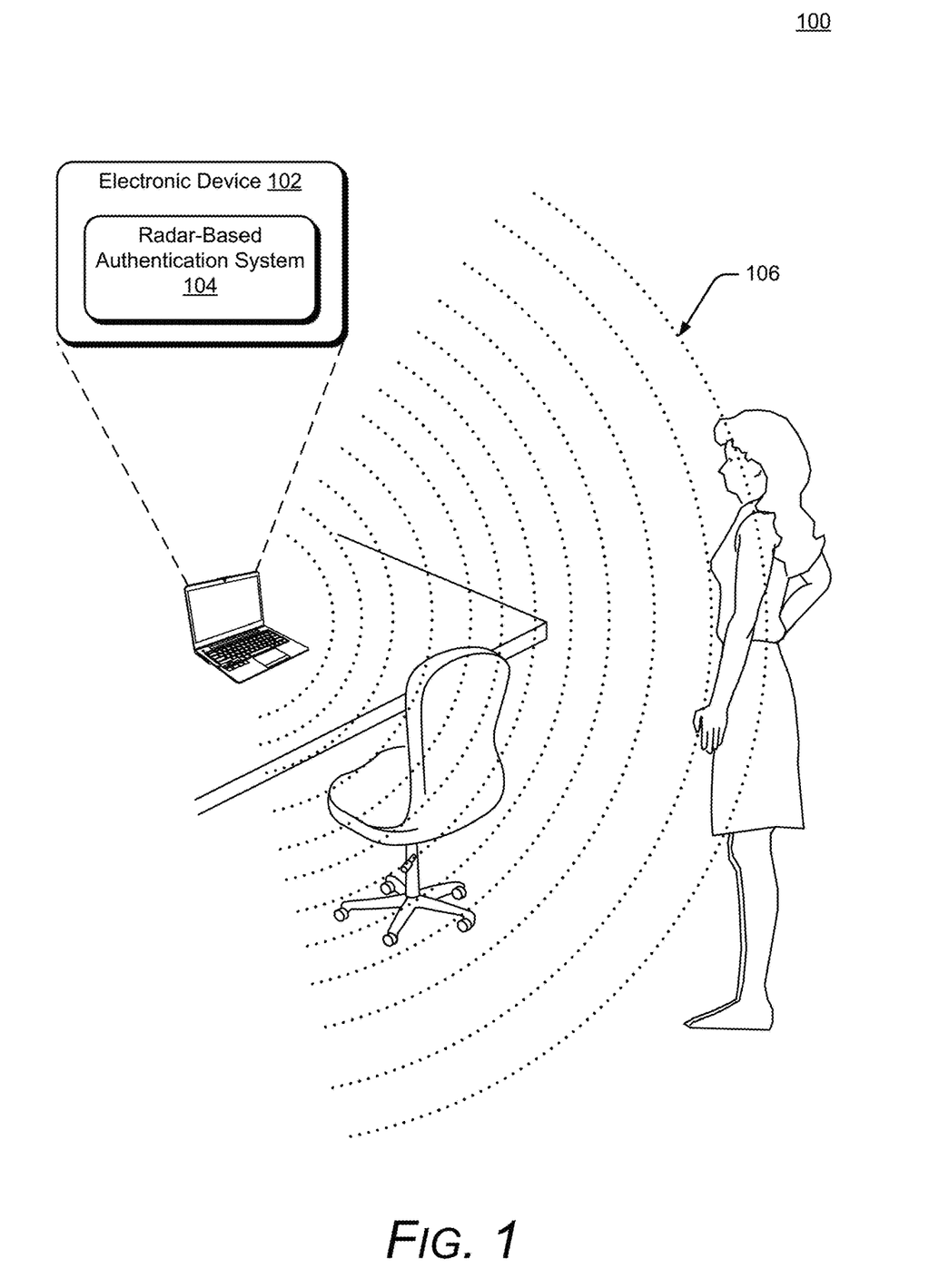
FIG. 1 illustrates an example environment in which techniques enabling seamless authentication using radar can be implemented.

FIG. 1 illustrates an example environment in which techniques enabling seamless authentication using radar can be implemented. The example operating environment 100 includes an electronic device 102 that includes a radar-based authentication system 104. In the example operating environment 100, the radar-based authentication system 104 provides a radar field 106 that enables one of the electronic devices 102, laptop computer 102-1, to sense objects near the electronic device.

Laptop computer 102-1 includes, or is associated with, the radar-based authentication system 104. These devices work together to enable seamless authentication of users near the laptop computer 102-1. Assume, for example, that the laptop computer 102-1 includes data and applications to which the user wants to control access. To control access, the user implements an authentication protocol. This can present some challenges to the user, such as needing to de-authenticate or lock the laptop computer 102-1 each time the user leaves the area and then recalling and entering the authentication credential every time the laptop computer 102-1 is locked. Further, the complexity and format of the credential can make authentication difficult and time-consuming for some users. Consider, however, the radar-based authentication system 104, which can provide a radar field 106 that enables the radar-based authentication system 104 to automatically authenticate the user. As is readily apparent, a seamless and automatic authentication system can be substantially easier and provide a better experience over a conventional active and user-initiated authentication protocol.

Figure 2:
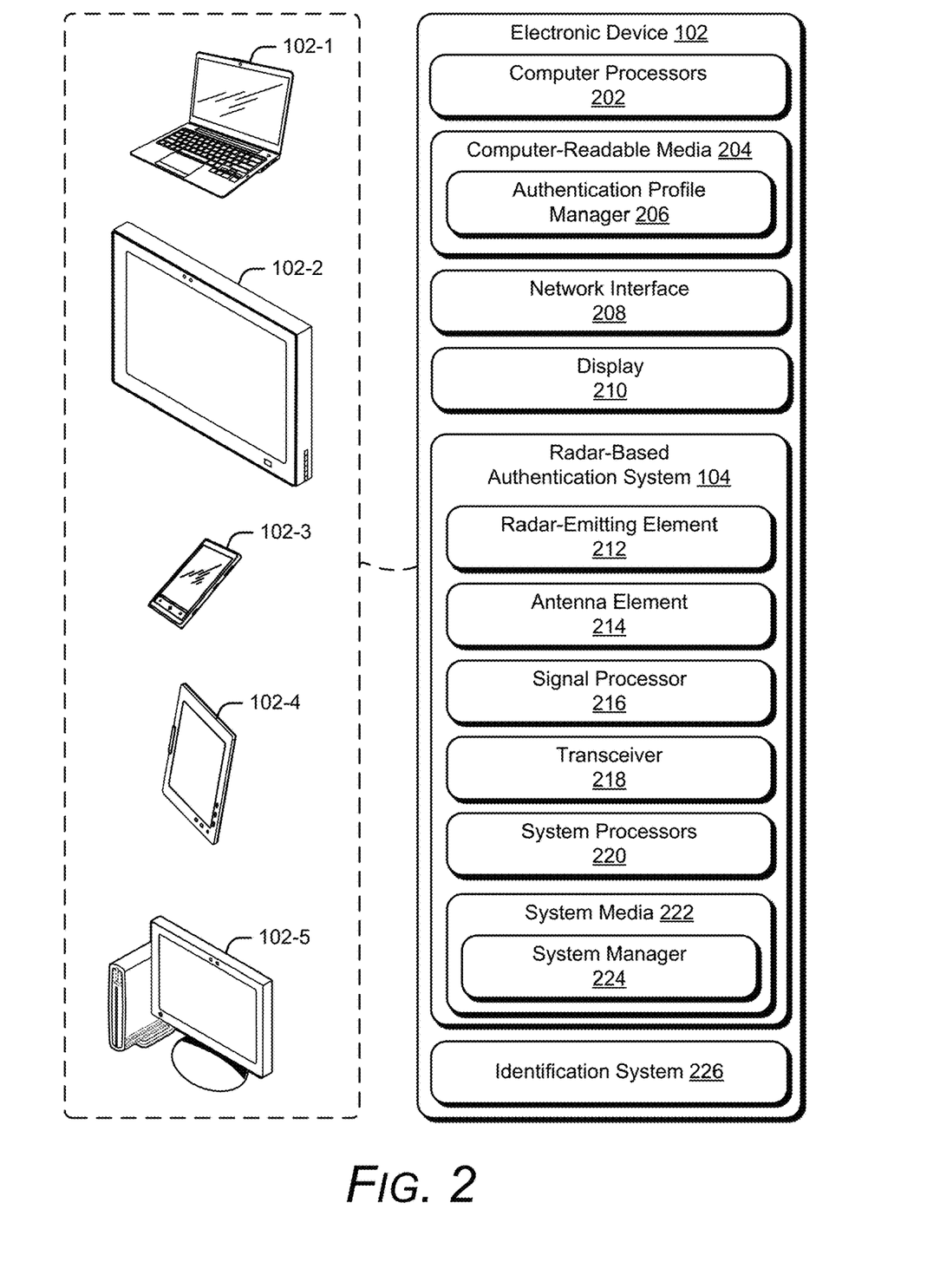
FIG. 2 illustrates an example implementation of the electronic device of FIG. 1 that can implement seamless authentication using radar.

In more detail, consider FIG. 2, which illustrates an example implementation of the electronic device 102 of FIG. 1 that can implement seamless authentication using radar. In FIG. 2, the radar-based authentication system 104 is part of the electronic device 102. In other implementations, the radar-based authentication system 104 may be separate or remote from the electronic device 102. The electronic device 102 is illustrated with various example devices, including the noted laptop computer 102-1, a television 102-2, a smartphone 102-3, a tablet 102-4, and a desktop computer 102-5, though other devices may also be used, such as home automation and control systems, entertainment systems, audio systems, home appliances, security systems, netbooks, and e-readers. The electronic device 102 can be wearable, non-wearable but mobile, or relatively immobile (e.g., desktops and entertainment systems).

Note also that the radar-based authentication system 104 can be used with, or embedded within, many different electronic devices or peripherals. For example, the radar-based authentication system 104 may be implemented as a component in a wall of a home to authenticate users for access to home appliances and systems (e.g., a home security system control panel) or in an automobile to control internal functions such as cruise control, speed, or even the ignition system to control driving of the car.

The radar field 106 can be invisible and penetrate some materials, such as textiles, thereby further expanding how the radar-based authentication system 104 can be used and implemented. While examples shown herein generally show one radar-based authentication system 104 per device, multiple systems can be used, thereby increasing speed and accuracy in authentication.

The electronic device 102 includes one or more computer processors 202 and computer-readable media 204, which includes memory media and storage media. Applications and/or an operating system (not shown) implemented as computer-readable instructions on computer-readable media 204 can be executed by processors 202 to provide some of the functionalities described herein. The computer-readable media 204 also includes an authentication profile manager 206. The authentication profile manager 206 can store and manage information that can be used to authenticate a user. For example, the authentication profile manager 206 may store pre-recorded radar reflection profiles, radar images, still or video images, audio samples, or other information that can be compared with similar types of information related to persons that enter the radar field 106. In some cases, the information used by the authentication profile manager 206 may be stored in another location (e.g., a memory device or location, or a network storage location) and accessed by the authentication profile manager 206. The information used by the authentication profile manager 206 may be provided by the authorized user or obtained from another source (e.g., a social media profile or other profile).

The electronic device 102 may also include a network interface 208 for communicating data over wired, wireless, or optical networks and a display 210. By way of example and not limitation, the network interface 208 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

The radar-based authentication system 104, as noted above, is configured to authenticate users of electronic devices. To enable this, the radar-based authentication system 104 includes a radar-emitting element 212, an antenna element 214, and a signal processor 216. Generally, the radar-emitting element 212 is configured to provide a radar field (e.g., the radar field 106). In some cases, the radar field may be configured to reflect from fabric, such as clothing. In other cases, the radar field may be configured to penetrate fabric or other obstructions and reflect from human skin or tissue. These fabrics or obstructions can include wood, glass, plastic, cotton, wool, nylon and similar fibers, and so forth, while reflecting from human tissues, such as a person's face.

The radar field that is provided may be any of a variety of radar fields, including a wide field, a narrow field, a surface field, a volume field, a shaped field (e.g., a hemisphere, a cube, a fan, a cone, or a cylinder), a steered field, an un-steered field, a close range (near) field, or an intermediate or far range field. Thus, a radar field provided by the radar-emitting element 212 can be a small size, such as approximately zero or one millimeters to 1.5 meters, or an intermediate size, such as approximately one to 30 meters. It is to be appreciated that these sizes are merely for discussion purposes, and that any other suitable size or range of radar field can be used.

Additionally, the radar-emitting element 212 may use a continuous-wave signal or pulsed-Doppler signal and use any of a variety of frequencies, update rates, pulse widths, interpulse periods (IPP), transmit powers, and modulations. For example, the radar-emitting element 212 can be configured to emit continuously modulated radiation, ultra-wideband radiation, or sub-millimeter-frequency radiation. The radar-emitting element 212, in some cases, is configured to form radiation in beams, the beams aiding the antenna element 214 and the signal processor 216 to determine which of the beams are interrupted, and thus locations of particular objects or interactions within the radar field.

The antenna element 214 is configured to receive reflections of, or sense objects in, the radar field. In some cases, the reflections include those from human tissue that is within the radar field, such as a person's face or body, or from movements from a person's head, legs, arms, hands, or torso. In other cases, the reflections include those from clothing or other material worn by a human that is within the radar field. The antenna element 214 can include one or many antennas or sensors, such as an array of radiation sensors, the number in the array based on a desired resolution and whether the field is a surface or volume.

The signal processor 216 is configured to process the received reflections within the radar field to provide authentication data associated with the received reflections. The authentication data is data, based on the radar reflections, that is usable to determine whether an object in the radar field is a person and, in some implementations, whether the person is a particular person that has access to the electronic device 102 (e.g., to authenticate the person as an authorized user). For example, the authentication may be a radar image of an object that includes information that is sufficient to identify the object as a person, or to identify the object as a particular person. The antenna element 214 may, in some cases, be configured to receive reflections from multiple human tissue targets that are within the radar field and the signal processor 216 be configured to process the received interactions sufficient to differentiate one of the multiple human tissue targets from another of the multiple human tissue targets. These targets may include a face, a head, a torso, hands, arms, and legs, from a same or different person. By so doing, multiple different persons can be distinguished, one from another.

To sense objects through obstructions, the radar-emitting element 212 can also be configured to emit radiation capable of substantially penetrating fabric, wood, plastic, and glass. The antenna element 214 is configured to receive the reflections from the human tissue through the fabric, wood, plastic, or glass. Thus, unlike optical sensors, such as a camera, the radar-emitting element 212 and the antenna element 214 do not require an aperture in the enclosure of the electronic device 102. The signal processor 216 is configured to analyze the received reflections even with the received reflections partially affected by passing through the obstruction twice. For example, the radar signal passes through the device enclosure and a fabric layer interposed between the radar emitter and a human arm. The radar signal then reflects off the human arm, and back through the fabric layer and the device enclosure to the antenna element.

The radar-based authentication system 104 also includes a transmitting device configured to transmit authentication data to a remote device, though this need not be used when the radar-based authentication system 104 is integrated with the electronic device 102. When included, authentication data can be provided in a format usable by a remote electronic device sufficient for the remote electronic device to perform an authentication in those cases where the authentication is not performed by the radar-based authentication system 104 or the electronic device 102.

In more detail, the radar-emitting element 212 can be configured to emit microwave radiation in a 1 GHz to 300 GHz range, a 3 GHz to 100 GHz range, and narrower bands, such as 57 GHz to 63 GHz, to provide the radar field. This range affects an ability of the antenna element 214 to receive interactions, such as to follow locations of two or more targets to a resolution of about two to about 25 millimeters. The radar-emitting element 212 can be configured, along with other entities of the radar-based authentication system 104, to have a relatively fast update rate, which can aid in resolution of the interactions.

By selecting particular frequencies, the radar-based authentication system 104 can operate to substantially penetrate clothing while not substantially penetrating human tissue. Further, the antenna element 214 or the signal processor 216 can be configured to differentiate between interactions in the radar field caused by clothing from those interactions in the radar field caused by human tissue. Thus, a person wearing gloves or a long sleeve shirt that could interfere with authentication when using some conventional techniques (e.g., an image-based system), can still be authenticated with the radar-based authentication system 104.

The radar-based authentication system 104 may also include a transceiver 218, one or more system processors 220 and a system media 222 (e.g., one or more computer-readable storage media). The system media 222 includes a system manager 224, which can perform various operations, including authenticating a user based on authentication data from the signal processor 216. In some implementations, the system manager 224 may authenticate a user and cause the transceiver 218 to transmit the authentication to a remote device effective to grant access to the remote device. This is but one of the ways in which authentication through the radar-based authentication system 104 can be enabled. Operations of the system manager 224 are provided in greater detail as part of methods 300 and 600 below.

In some implementations, the electronic device 102 may also include an identification system 226. The identification system 226 includes at least one non-radar sensor, such as a camera or a microphone, which can be used to authenticate a person as an authorized user. Operations of the identification manager 226 are provided in greater detail as part of methods 300 and 600 below.

Note that in different implementations, the electronic device 102 may use multiple types of radar and other sensors (e.g., the identification system 226) in various combinations. For example, to conserve battery power, a lower-power radar may be used by the radar-based authentication system 104 to scan an area around the device for objects in the radar field and determine whether the object is a person. In some implementations, to determine whether the person is an authorized user, the radar-based authentication system 104 may switch to a different type of radar (e.g., with a higher power level, a different frequency, or a different shape). In other implementations, to determine whether the person is an authorized user, the radar-based authentication system 104 may activate the identification system 226 and use a non-radar sensor (e.g., a high-resolution camera or a microphone). In this way, different implementations of the electronic device 102, with different configurations of radar and non-radar sensors, can be used with seamless authentication using radar.

Figure 7:
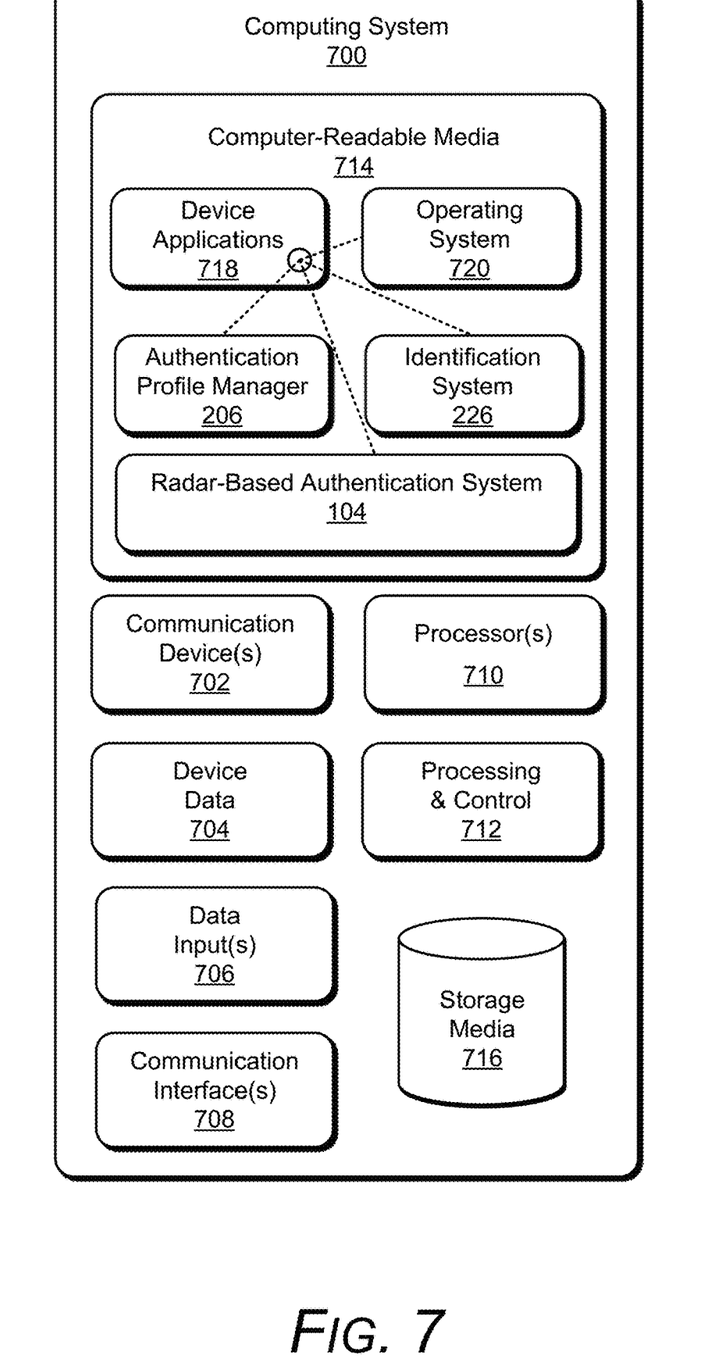
FIG. 7 illustrates an example computing system implementing, or in which techniques may be implemented that enable, seamless authentication using radar.

These and other capabilities and configurations, as well as ways in which entities of FIGS. 1 and 2 act and interact, are set forth in greater detail below. These entities may be further divided, combined, and so on. The example operating environment 100 of FIG. 1 and the detailed illustrations of FIGS. 2 and 7 illustrate some of many possible environments and devices capable of employing the described techniques.

Example Methods

Figure 3:
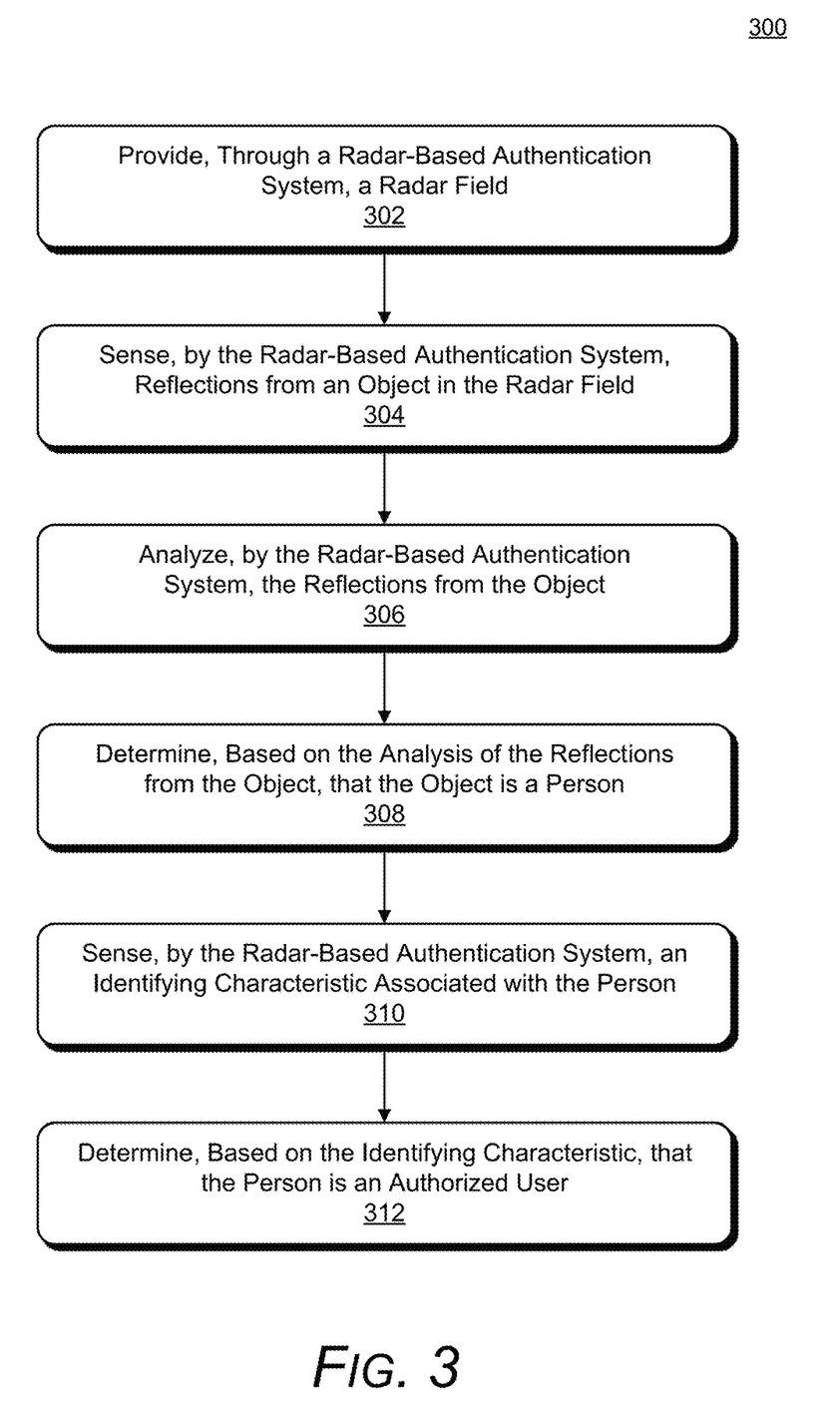
FIG. 3 illustrates an example method enabling seamless authentication using radar.
Figure 6:
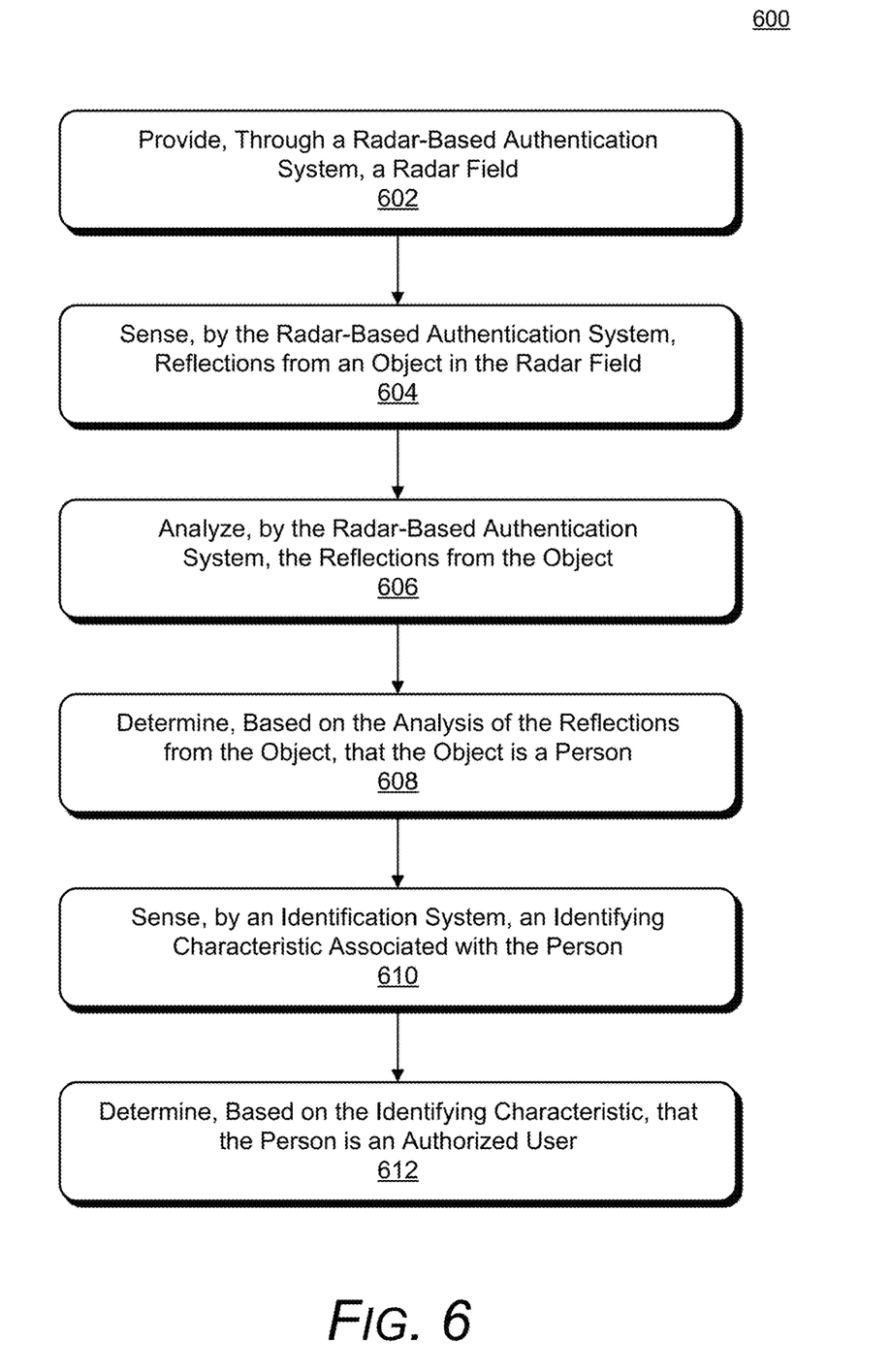
FIG. 6 illustrates another example method enabling seamless authentication using radar.

FIG. 3 and FIG. 6 depict methods enabling seamless authentication using radar. The method 300 uses a radar field to determine that an object in the radar field is a person and further uses radar to authenticate the person as an authorized user. The method 600 uses a radar field to determine that an object in the radar field is a person and further uses an identification system with at least one non-radar sensor to authenticate the person as an authorized user. The methods 300 and 600 can be used separate from one another or in conjunction with, in whole or in part, one another.

The methods 300 and 600 are shown as sets of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIG. 2, reference to which is made for example only. The techniques are not limited to performance by one entity or multiple entities operating on one device.

At 302, a radar field is provided. This radar field can be caused by any of a variety of devices or entities, such as the authentication profile manager 206, the system manager 224, or the signal processor 216. For example, the system manager 224 may cause the radar-emitting element 212 of the radar-based authentication system 104 to provide (e.g., project or emit) one of the described radar fields (e.g., the radar field 106) noted above.

At 304, reflections from an object in the radar field are sensed by the radar-based authentication system 104. For example, the authentication profile manager 206, the system manager 224, or the signal processor 216 may cause the antenna element 214 to receive reflections from an object in the radar field. The received reflections may be an initial reflection from the object.

At 306, the reflections from the object in the radar field are analyzed by the radar-based authentication system 104. For example, the authentication profile manager 206 or the system manager 224 may cause the signal processor 216 to process the reflections from the object and provide authentication data for the object to the radar-based authentication system 104. The authentication data may include, for example, a shape and size of the object.

At 308, it is determined, based on the analysis of the reflections from the object, that the object is a person. The analysis may be performed by comparing the reflections from the object to stored reference data and determining, based on the comparison, that the object is a human body. For example, the authentication data (from block 306) may be compared to the stored reference data and the authentication profile manager 206, the system manager 224, or the signal processor 216 may then determine, based on the authentication data for the object, that the object is a person.

The stored reference data may include radar-reflection profiles of exemplary human bodies that can be used to distinguish between reflections from persons and from other objects. The stored reference data may also include user-specific radar-reflection profiles that can be used to identify, and distinguish between, different persons. The stored reference data can be stored by any of variety of devices, such as the authentication profile manager 206.

At 310, in response to determining that the object is the person, an identifying characteristic associated with the person is sensed by the radar-based authentication system. The identifying characteristic may be sensed by analyzing the reflections received from the object at block 304. In other implementations, the radar-based authentication system 104 may sense other or additional reflections from the person (e.g., the object) and analyze the other or additional reflections to sense the identifying characteristic. For example, the authentication profile manager 206, the system manager 224, or the signal processor 216 may cause the antenna element 214 to receive other reflections from the object in the radar field and cause the signal processor 216 to process the other received reflections to provide other authentication data to the radar-based authentication system 104.

In some implementations, sensing the identifying characteristic may be performed using a radar-based facial recognition technique or a radar-based breathing-pattern recognition technique. For example, a radar image of an authorized user's face can be recorded and stored (e.g., by the authentication profile manager 206) and used for authenticating a person as an authorized user by comparing the stored radar image to a radar image of a person in the area of the electronic device 102. This technique for authentication may be more secure than conventional techniques not only because an authorized user's face is not typically obtainable by an unauthorized person (unlike, for example, a password), but also because the radar image of the authorized user's face does not visually identify the authorized user like a photographic or video does.

Further, in some cases the radar-based authentication system 104 can compensate for some changes in an authorized user's appearance. For example, in implementations that use a radar field that reflects from human tissue, an authorized user who changes hairstyle, grows or shaves facial hair, or makes other changes that may significantly alter outward appearance, can still be recognized by the radar-based authentication system 104. Similarly, a radar-based breathing-pattern recognition technique can use a stored radar image of an authorized user's breathing pattern (or other biometric characteristic, such as a cardiac profile), and use the stored breathing pattern to identify the authorized user.

In other implementations, the identifying characteristic may be the person's gait (e.g., the person's manner or style of walking or running) For example, a radar image of an authorized user's gait can be recorded and stored (e.g., by the authentication profile manager 206) and used for authenticating a person as an authorized user by comparing the stored radar image to a radar image of a person in the area of the electronic device 102. In some cases, the identifying characteristic may be a biometric characteristic of the person, such as the person's height, a ratio between a size or length of particular body parts or bones (e.g., shin to thigh or upper arm to lower arm), an arm or leg length, a hip width, or a shoulder width.

In still other implementations, the identifying characteristic may be an item, worn on the person, that is detectable by the radar-based authentication system 104. For example, an authorized user may record and store (e.g., using the authentication profile manager 206) a radar image of a ring, a pair of glasses, or a piece of jewelry. When the radar-based authentication system 104 senses radar reflections from the item worn on the person, it can authenticate the user by comparing the reflections to the stored radar image.

Additionally or alternatively, the identifying characteristic may be a gesture that is detectable by the radar-based authentication system 104. For example, an authorized user may record and store (e.g., using the authentication profile manager 206) radar images of one or more gestures. When the radar-based authentication system 104 senses radar reflections corresponding to the gestures, it can authenticate the user making the gesture by comparing the reflections to the stored radar image. In some case, the gesture may be a gesture that is not typically visible to observers (e.g., a micro-gesture), such as facial expressions, head movements, or posture changes.

At 312, based on the identifying characteristic associated with the person, it is determined that the person is an authorized user. The determination may be performed by comparing the reflections (including the other or the additional reflections) from the object (e.g., the person) to the stored reference data, which, as noted, can include user-specific radar-reflection profiles that can be used to identify, and distinguish between, different persons. For example, the other authentication data (from block 310) may be compared to the stored reference data and the authentication profile manager 206, the system manager 224, or the signal processor 216 may then determine, based on the other authentication data for the object, that the person is an authorized user.

In some implementations, the radar-based authentication system 104 may grant the authorized user access to the electronic device 102 (e.g., based on one or more of the identifying characteristics described with respect to the method 300 above). Additionally, the radar-based authentication system 104 may determine, based on another analysis of additional reflections from the authorized user, that the authorized user is engaged with the electronic device 102. For example, the radar-based authentication system 104 may use radar reflections from the authorized user to determine that the authorized user is within a threshold distance of the electronic device 102. In another example, again using radar reflections from the authorized user, the radar-based authentication system 104 may determine a head position of the authorized user, such as the angle relative to the electronic device 102, or a motion pattern of the authorized user, such as back and forth movements, that suggest the authorized user is reading.

In response to determining that the authorized user is engaged with the device, the radar-based authentication system 104 can maintain the authorized user's access to the device, without requiring additional authentication. In this way, the radar-based authentication system 104 can maintain consistent and uninterrupted access to the electronic device 102 for the authorized user, which may improve the authorized user's efficiency, workflow, and experience with the electronic device 102.

Similarly, the radar-based authentication system 104 may determine, based on another analysis of additional reflections from the authorized user, that the authorized user is not engaged with the electronic device 102. For example, the radar-based authentication system 104 may use radar reflections from the authorized user to determine that the authorized user is no longer within a threshold distance of the electronic device 102.

In another example, again using radar reflections from the authorized user, the radar-based authentication system 104 may determine a head position of the authorized user, such as the angle relative to the electronic device 102, or a change in a breathing pattern of the authorized user, such as slower and shallower breathing, that suggest the authorized user is sleeping. In response to determining that the authorized user is not engaged with the electronic device 102, the radar-based authentication system 104 can end the authorized user's access to the electronic device 102. In this way, the radar-based authentication system 104 can de-authenticate a user, or lock the electronic device 102, when the authorized user is not engaged with the electronic device 102, which may conserve battery power and reduce the likelihood of access by unauthorized users. In some cases, the radar-based authentication system 104 may continue to operate to determine whether the authorized user is engaged and, based on the authorized user being engaged or not engaged, de-authenticate and re-authenticate the authorized user, as appropriate.

Figure 4:
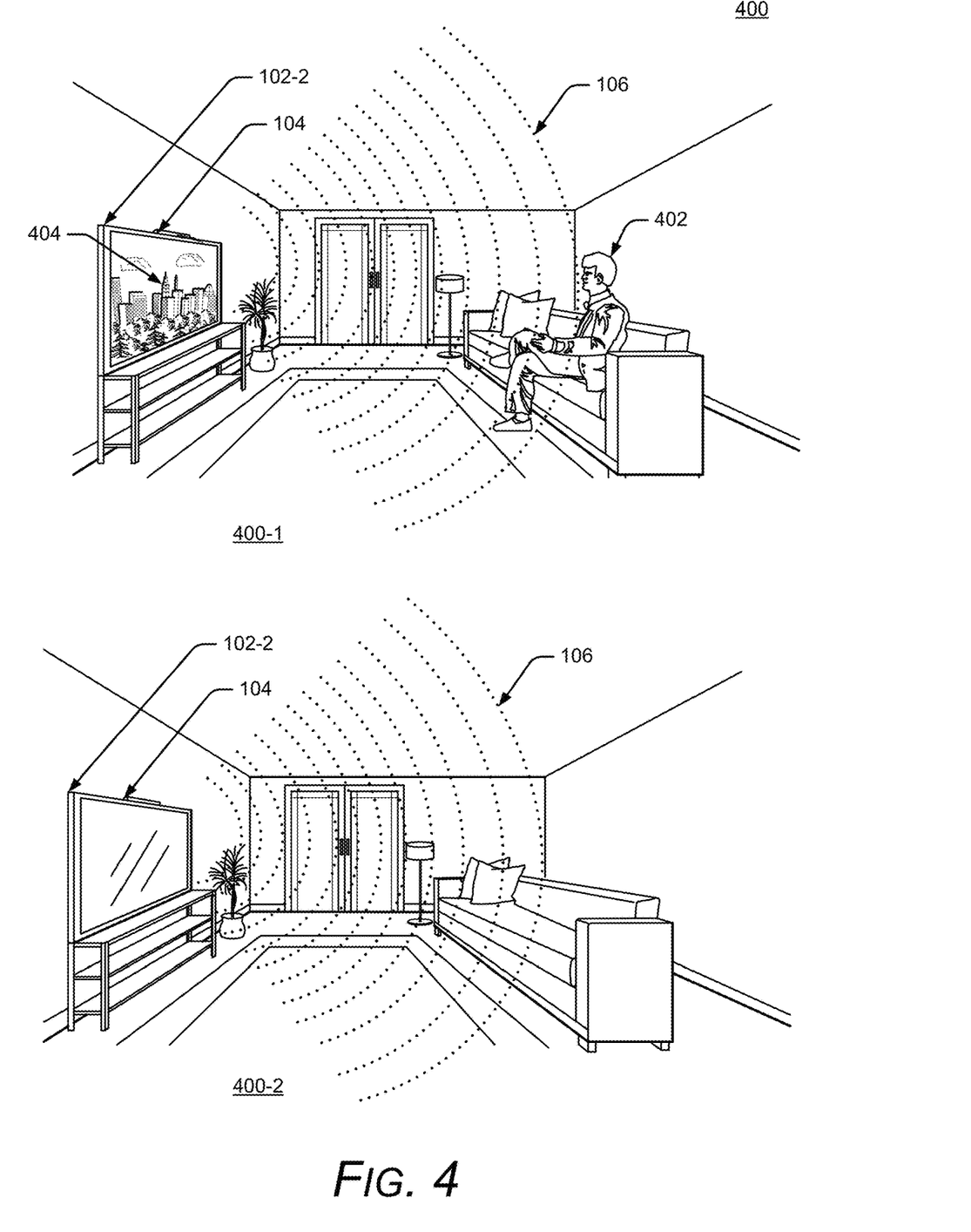
FIG. 4 and FIG. 5 illustrate additional details of the method of FIG. 3.

By way of further example, consider FIG. 4, which illustrates generally an example environment 400 that describes additional details of the method 300. In a detail view 400-1, the example environment 400 includes a person 402, the electronic device 102-2, and the radar-based authentication system 104, which is providing the radar field 106. In the detail view 400-1, the radar-based authentication system 104 has determined that the person 402 is an authorized user (e.g., using one or more techniques as described with reference to the method 300 above), and the electronic device 102-2 is displaying content 404 for the authorized user.

In a detail view 400-2, the authorized user (e.g., the person 402) has left the area of the electronic device 102-2. The radar-based authentication system 104 has sensed that the authorized person is no longer within a threshold distance of the electronic device 102-2 and has consequently ended access to the electronic device 102-2 and is no longer displaying the content 404. In this way, the radar-based authentication system 104 enables the authorized user to leave the area of the electronic device 102-2 without having to actively de-authenticate, saving time and reducing the likelihood that the electronic device 102-2 will be left accessible without an authorized user present (e.g., if the authorized user forgets to de-authenticate or lock the electronic device).

Returning to FIG. 3 and the method 300, in some implementations, the radar-based authentication system 104 may determine that another person has come within a threshold distance from the electronic device 102. In response to determining that the other person has come within the threshold distance, the radar-based authentication system 104 can end access to the electronic device 102 by the authorized user.

Figure 5:
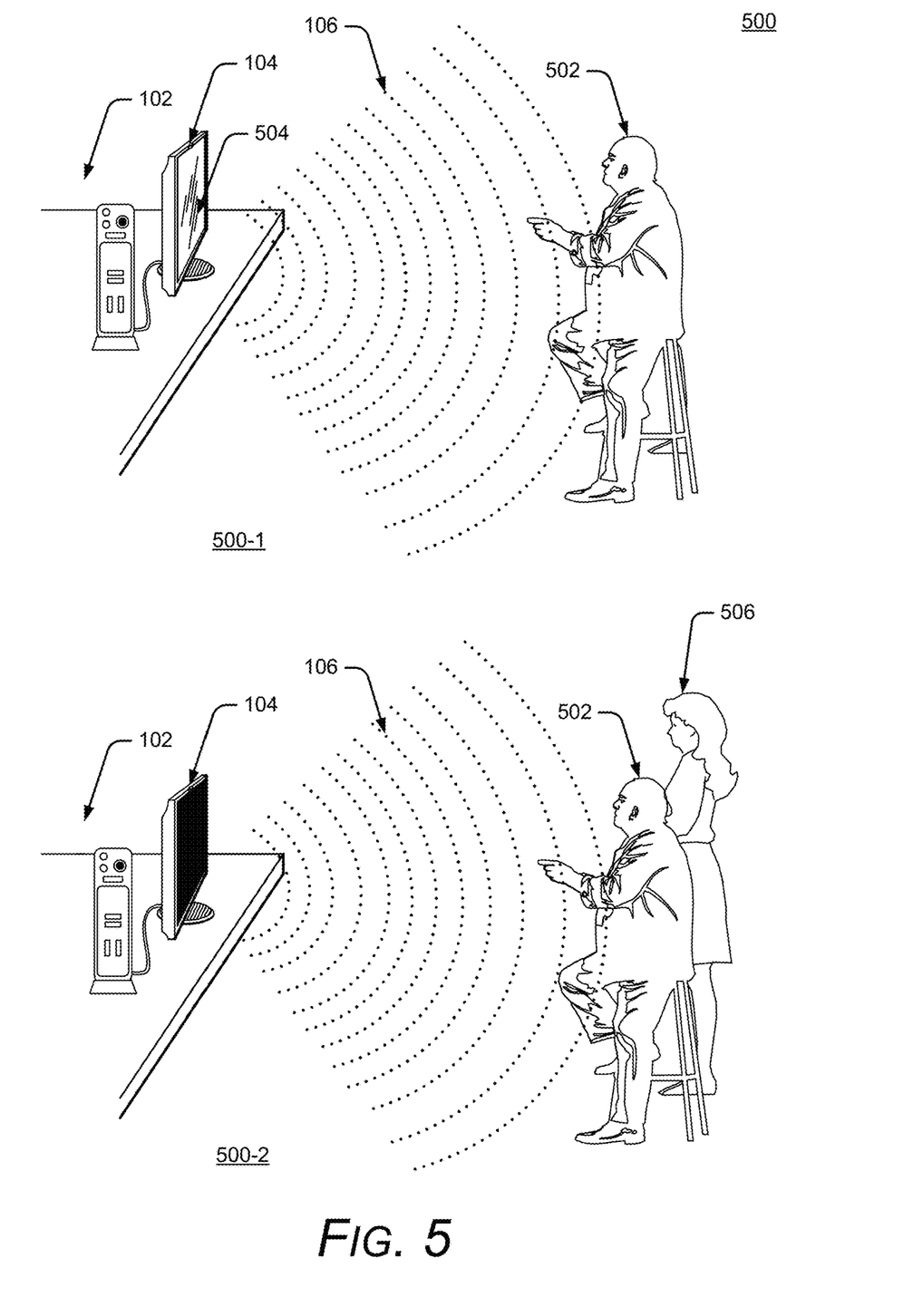

By way of further example, consider FIG. 5, which illustrates generally an example environment 500 that describes additional details of the method 300. In a detail view 500-1, the example environment 500 includes a person 502, the electronic device 102-5, and the radar-based authentication system 104, which is providing the radar field 106. In the detail view 500-1, the person 502 simply sits down on a stool near the electronic device 102-5 and by so doing walks into the radar field 106. In this example, the radar-based authentication system 104 has determined that the person 402 is an authorized user (e.g., using one or more techniques as described with reference to the method 300 above), and the electronic device 102-2 is displaying content 504 for the authorized user.

In a detail view 500-2, another person 506 has entered the area of the electronic device 102-5. In this example, the radar-based authentication system 104 has sensed that the other person 506 is not an authorized user (e.g., using one or more techniques as described with reference to the method 300 above) and has consequently ended access to, and locked the display of, the electronic device 102-5 and is no longer displaying the content 504 (the screen is darkened). In the example 500, the authorized user is facing the electronic device 102-5 and the other person 506 is approaching from behind the authorized user. Even though the authorized user may not notice the other person 506 approaching, the radar-based authentication system 104 can sense the other person 506 and de-authenticate automatically. In some implementations, the radar-based authentication system 104 may prompt the user and ask whether the electronic device should be locked (e.g., via a voice or on-screen prompt). Additionally, the radar-based authentication system 104 may automatically re-authenticate the person 502 when the other person 506 leaves the area of the electronic device 102-5.

In the example 500, the radar-based authentication system 104 ended access locked the display of the electronic device 102-5 when another (non-authorized) person entered the area. In some case, the radar-based authentication system 104 may consider other factors before de-authenticating. For example, the radar-based authentication system 104 may have access to the applications or content running on the electronic device 102 and de-authenticate when the application or content suggest de-authentication. Thus, the radar-based authentication system 104 may de-authenticate if the authorized user is engaged in secured browsing (versus "regular" browsing), or if the rating of the content exceeds a rating limit, or if the content or application has its own separate authentication (e.g., suggesting that it contains confidential information).

In other cases involving multiple persons in the radar field 106, the radar-based authentication system 104 may use techniques to increase an accuracy of authentication. For example, when multiple persons are sensed in the radar field 106, the radar-based authentication system 104 may employ more than one technique (or more than the default number of techniques), such as radar-based facial recognition and radar-based gait recognition, and so forth.

As noted, the radar field used to sense objects and identifying characteristics (e.g., the radar field 106) may be able to detect reflections from clothing or from human tissue. In some implementations, the radar-based authentication system 104 may include multiple radar emitting elements that can provide multiple types of radar fields. In these implementations, the radar-based authentication system 104 may use different radar fields in different situations. For example, the radar-based authentication system 104 may use a radar field that reflects from clothing when no authorized users are present near the electronic device. Once an object is sensed in the field, the radar-based authentication system 104 can then switch to a radar field that can penetrate clothing and reflect from human tissue, which may provide a more-accurate authentication.

In some implementations (not shown in FIG. 4), an electronic device that includes the radar-based authentication system 104 can provide an authentication to another electronic device that may not include the radar-based authentication system 104. For example, consider a case in which a user enters an area with multiple electronic devices that require authentication to enable the user to access the devices (e.g., the laptop computer 102-1 and the television 102-2). Assume that the user is also carrying the smartphone 102-3). Only the laptop computer 102-1 includes the radar-based authentication system 104, and when the user enters the radar field provided by the radar-based authentication system 104, the user is automatically authenticated, using for example, the methods described herein.

Further assume that the laptop computer 102-1, the television 102-2, and the smartphone 102-3 are all connected to a secure communication network (e.g., a Bluetooth network or a secured Wi-Fi network). Because the electronic devices are connected via a secure network, the laptop computer 102-1 can communicate with the other devices and provide the authentication credentials to the other electronic devices, so that the user can be seamless authenticated to the television 102-2 and the smartphone 102-3, even though those devices do not include the radar-based authentication system 104. Additionally, in some implementations, the radar-based authentication system 104 can also provide information to the other electronic devices related to a position or posture of the user (e.g., sitting, standing, or passing through). In this way, the electronic devices can provide access in a mode or manner that is appropriate to the user's location or posture (e.g., screen resolution or brightness, and so forth).

FIG. 6 illustrates another example method 600 that enables seamless authentication using radar. At 602, a radar field is provided. This radar field can be caused by any of a variety of devices or entities, such as the authentication profile manager 206, the system manager 224, or the signal processor 216. For example, the system manager 224 may cause the radar-emitting element 212 of the radar-based authentication system 104 to provide (e.g., project or emit) one of the described radar fields (e.g., the radar field 106) noted above.

At 604, reflections from an object in the radar field are sensed by the radar-based authentication system 104. For example, the authentication profile manager 206, the system manager 224, or the signal processor 216 may cause the antenna element 214 to receive reflections from an object in the radar field. The received reflections may be an initial reflection from the object.

At 606, the reflections from the object in the radar field are analyzed by the radar-based authentication system 104. For example, the authentication profile manager 206 or the system manager 224 may cause the signal processor 216 to process the reflections from the object and provide authentication data for the object to the radar-based authentication system 104. The authentication data may include, for example, a shape and size of the object.

At 608, it is determined, based on the analysis of the reflections from the object, that the object is a person. The analysis may be performed by comparing the reflections from the object to stored reference data and determining, based on the comparison, that the object is a human body. For example, the authentication data (from block 606) may be compared to the stored reference data and the authentication profile manager 206, the system manager 224, or the signal processor 216 may then determine, based on the authentication data for the object, that the object is a person.

As noted, the stored reference data may include radar-reflection profiles of exemplary human bodies that can be used to distinguish between reflections from persons and from other objects. The stored reference data may also include user-specific profiles that can be used to identify, and distinguish between, different persons (e.g., image or video profile, audio profiles, other biometric profiles, or item profiles). The stored reference data can be stored by any of variety of devices, such as the authentication profile manager 206.

At 610, in response to determining that the object is the person, an identifying characteristic associated with the person is sensed by an identification system. The identification system (e.g., the identification system 226 as described above) includes at least one non-radar sensor, such as a camera or a microphone, which can be used to authenticate the person in the radar field as an authorized user. The identification system 226 may be activated (e.g., by the radar-based authentication system 104) in response to the determination, at block 608, that the object is a person. In other cases, the identifications system may run in an "always on" mode or be activated by another trigger, such as when the object enters the radar field 106 at block 604. In some implementations, the identification system 226 may provide other authentication data to the radar-based authentication system 104 and the other authentication data may be used to determine that the person is an authorized user by comparing the other authentication data to the stored reference data (e.g., the user-specific profiles).

In some implementations, the identification system 226 may sense the identifying characteristic by comparing real-time or near real-time information about the person in the radar field 106 to stored information about authorized users (e.g., the stored reference data). For example, the identification system 226 may perform an image-based facial recognition technique or an image-based tattoo recognition technique. In this example, the identification system 226 captures an image of a person in the area of the electronic device 102, using a camera or other image-capture device, and compares the captured image to a stored image of an authorized user's face. The stored image may be recorded and stored by any of a variety of entities or devices (e.g., the authentication profile manager 206), and updated automatically or manually by the user. Similarly, an image-based tattoo recognition technique can store an image of an authorized user's tattoo (or other visual characteristic, such as a birthmark or a scar), and use the stored image to identify the authorized user by comparing an image of the person in the radar field to the stored image of the authorized user's tattoo (or other visual characteristic).

In other implementations, the identifying characteristic may be a biometric characteristic of the person, such as the person's height, a ratio between a size or length of particular body parts or bones (e.g., shin to thigh or upper arm to lower arm), an arm or leg length, a hip width, or a shoulder width. For example, the identification system 226 may capture an image of a person in the area of the electronic device 102, using a camera or other image-capture device, and compare the captured image to a stored image of an authorized user's body. By comparing the stored images, the identification system 226 may determine that the biometric characteristic of the person matches the biometric characteristic of the stored image. Other examples include seamless (passive) retina scanning or voice comparison techniques. Thus, the identification system 226 can use a high-resolution image-capture device to perform a comparison between a stored image of an authorized user's retina and a real- or near real-time captured image of a retina of the person in the radar field 106. Similarly, the identification system 226 can use a microphone to perform a comparison between stored audio files of an authorized user's voice and a real- or near-real-time captured audio of a voice of the person in the radar field 106.

In still other implementations, the identifying characteristic may be an item, worn on the person, that is detectable by the identification system 226. For example, an authorized user may record and store (e.g., using the authentication profile manager 206) an image of a ring, a pair of glasses, or a piece of jewelry. The identification system 226 can use an image-capture device to capture an image of the item worn on the person in the radar field and authenticate the user by comparing the captured image to the stored image.

At 612, based on the identifying characteristic associated with the person, it is determined that the person is an authorized user. The determination may be performed as described above, using facial recognition, tattoo recognition, voice recognition, retinal recognition, recognition of other biometric characteristics, or recognition of items worn or carried by the person in the radar field 106.

Example Computing System

FIG. 7 illustrates various components of an example computing system 700 that can be implemented as any type of client, server, and/or electronic device as described with reference to the previous FIGS. 1-6 to implement seamless authentication using radar.

The computing system 700 includes communication devices 702 that enable wired and/or wireless communication of device data 704 (e.g., radar data, authentication data, reference data, received data, data that is being received, data scheduled for broadcast, data packets of the data, and so forth). The device data 704 or other device content can include configuration settings of the device, media content stored on the device, and/or information associated with a user of the device (e.g., an identity of a person within a radar field). Media content stored on the computing system 700 can include any type of radar, biometric, audio, video, and/or image data. The computing system 700 includes one or more data inputs 706 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 700 also includes communication interfaces 708, which can be implemented as any one or more of a serial and/or parallel interface, a wireless interface, any type of network interface, a modem, and as any other type of communication interface. The communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and so forth) that can process various computer-executable instructions to control the operation of the computing system 700 and to enable techniques for, or in which can be implemented, seamless authentication using radar. Alternatively or additionally, the computing system 700 can be implemented with any one or combination of hardware, firmware, or fixed logic circuitry that is implemented in connection with processing and control circuits, which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes computer-readable media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716.

The computer-readable media 714 provides data storage mechanisms to store the device data 704, as well as various device applications 718 and any other types of information and/or data related to operational aspects of the computing system 700. For example, an operating system 720 can be maintained as a computer application with the computer-readable media 714 and executed on the processors 710. The device applications 718 may include a device manager, such as any form of a control application, software application, signal-processing and control module, code that is native to a particular device, an abstraction module or gesture recognition module and so on. The device applications 718 may also include system components, engines, or managers to implement seamless authentication using radar, such as the radar-based authentication system 104 (including the system manager 224), the authentication profile manager 206, and the identification system 226. The computing system 700 may also include, or have access to, one or more machine learning systems.

CONCLUSION

Although implementations of techniques for, and apparatuses enabling, seamless authentication using radar have been described in language specific to features and/or methods, it is to be understood that the subject of the appended claims is not necessarily limited to the specific features or methods described. Rather, the specific features and methods are disclosed as example implementations enabling seamless authentication using radar.

What is claimed is:

1. An apparatus, comprising:
 a radar-based authentication system comprising:
  a radar-emitting element configured to provide a radar field;
  an antenna element configured to receive reflections from an object that is within the radar field; and
  a signal processor configured to process the received reflections to provide authentication data associated with the received reflections;
 one or more computer processors; and
 one or more computer-readable storage media having instructions stored thereon that, responsive to execution by the one or more computer processors, perform operations comprising:
  causing the radar-based authentication system to provide a radar field with the radar-emitting element;
  causing the signal processor to process first reflections from the object in the radar field received with the antenna element, to provide first authentication data for the object;
  determining, based on the first authentication data for the object, that the object is a person;
  responsive to determining that the object is the person, sensing, by an identification system comprising at least one non-radar sensor, an identifying characteristic associated with the person; and
  determining, based on the identifying characteristic associated with the person, that the person is an authorized user.

2. The apparatus of claim 1, wherein the operations further comprise:
 responsive to determining that the person is the authorized user, granting the authorized user access to an electronic device via the radar-based authentication system;
 causing the signal processor to process second reflections from the object in the radar field received with the antenna element, to provide second authentication data for the object;
 causing the radar-based authentication system to receive the second authentication data;
 determining, based on the second authentication data, that the authorized user is engaged with the electronic device; and
 responsive to determining that the authorized user is engaged with the device, maintaining access to the device by the authorized user without requiring additional authentication.

3. The apparatus of claim 2, wherein the operations further comprise:
 causing the signal processor to process third reflections from the object in the radar field received with the antenna element, to provide third authentication data for the object;
 causing the radar-based authentication system to receive the third authentication data;
 determining, based on the third authentication data, that the authorized user is not engaged with the electronic device; and
 responsive to determining that the authorized user is not engaged with the electronic device, ending access to the electronic device by the authorized user.

4. The apparatus of claim 3, wherein determining that the authorized user is not engaged with the electronic device further comprises one or more of:
 determining that the authorized user is outside a threshold distance of the electronic device;
 determining a first head position of the authorized user; or
 determining a first head-motion pattern of the authorized user.

5. The apparatus of claim 2, further comprising:
 determining that another person has come within a threshold distance from the electronic device; and
 responsive to determining that the other person has come within the threshold distance from the electronic device, ending access to the electronic device by the authorized user.

6. The apparatus of claim 5, further comprising:
 determining that the other person is outside the threshold distance; and
 responsive to determining that the other person is outside the threshold distance, re-authenticating the authorized user, automatically and without action by the authorized user.

7. The apparatus of claim 5, wherein ending access to the electronic device by the authorized user further comprises prompting the authorized user to take an action to end access to the electronic device.

8. The apparatus of claim 2, wherein determining that the authorized user is engaged with the electronic device further comprises one or more of:
   determining that the authorized user is within the threshold distance of the electronic device;
   determining a second head position of the authorized user; or
   determining a second head-motion pattern of the authorized user.

9. The apparatus of claim 1, further comprising activating the identification system based on at least one of:
   determining that the object is the person;
   determining that the object is in the radar field; or
   determining that the radar-based authentication system is in a powered-on state.

10. The apparatus of claim 1, wherein causing the signal processor to process the first reflections from the object in the radar field received with the antenna element, to provide authentication data for the object further comprises:
    causing the signal processor to compare the first reflections from the object to stored reference data, the stored reference data including radar-reflection profiles of human bodies; and
    determining, based on the comparison, that the object is a human body.

11. The apparatus of claim 1, wherein the operation of sensing the identifying characteristic comprises performing, by the identification system:
    an image-based facial recognition technique; or
    an image-based tattoo recognition technique.

12. The apparatus of claim 1, wherein:
    the operation of sensing the identifying characteristic comprises performing, by the identification system, an image-capture of the person and comparing the captured image to a stored image of the person's body; and
    the identifying characteristic is:
    an image-based biometric characteristic of the person; or
    an item worn on or carried by the person.

13. An apparatus, comprising:
    a radar-based authentication system comprising:
        a radar-emitting element configured to provide a radar field;
        an antenna element configured to receive reflections from an object that is within the radar field; and
        a signal processor configured to process the received reflections to provide authentication data associated with the received reflections;
    one or more computer processors; and
    one or more computer-readable storage media having instructions stored thereon that, responsive to execution by the one or more computer processors, perform operations comprising:
        causing the radar-based authentication system to provide a radar field with the radar-emitting element;
        causing the signal processor to process first reflections from the object in the radar field received with the antenna element, to provide first authentication data for the object;
        determining, based on the first authentication data for the object, that the object is a person;
        responsive to determining that the object is the person, causing the signal processor to process second reflections from the object in the radar field received with the antenna element, to provide second authentication data for the object;
        causing the radar-based authentication system to receive the second authentication data;
        determining, based on the second authentication data, an identifying characteristic associated with the person; and
        determining, based on the identifying characteristic associated with the person, that the person is an authorized user.

14. The apparatus of claim 13, wherein the operations further comprise:
    responsive to determining, based on the identifying characteristic associated with the person, that the person is the authorized user, granting the authorized user access to an electronic device via the radar-based authentication system;
    causing the signal processor to process third reflections from the object in the radar field received with the antenna element, to provide third authentication data for the object;
    causing the radar-based authentication system to receive the third authentication data;
    determining, based on the third authentication data, that the authorized user is engaged with the electronic device; and
    responsive to determining that the authorized user is engaged with the device, maintaining access to the device by the authorized user without requiring additional authentication.

15. The apparatus of claim 14, wherein the operations further comprise:
    causing the signal processor to process fourth reflections from the object in the radar field received with the antenna element, to provide fourth authentication data for the object;
    causing the radar-based authentication system to receive the fourth authentication data;
    determining, based on the fourth authentication data, that the authorized user is not engaged with the electronic device; and
    responsive to determining that the authorized user is not engaged with the electronic device, ending access to the electronic device by the authorized user.

16. The apparatus of claim 14, wherein the operations further comprise:
    determining that another person has come within a threshold distance from the electronic device; and
    responsive to determining that the other person has come within the threshold distance from the electronic device, ending access to the electronic device by the authorized user.

17. The apparatus of claim 13, wherein:
    the second authentication data includes at least a portion of the first authentication data; or
    the second authentication data includes no portion of the first authentication data.

18. A method, comprising:
    providing, through a radar-based authentication system, a radar field;
    analyzing first reflections received from an object in the radar field;
    determining, based on the analysis of the first reflections received from the object in the radar field, that the object is a person;

responsive to determining that the object is the person, analyzing second reflections received from the object in the radar field; and determining, based on the analysis of the second radar reflections received from the object in the radar field, that the person is an authorized user.

19. The method of claim 18, further comprising:

responsive to determining, based on the analysis of the second radar reflections received from the object in the radar field, that the person is the authorized user, granting the authorized user access to an electronic device via the radar-based authentication system;

analyzing third reflections received from the authorized user;

determining, based on the analysis of the third reflections received from the authorized user, that the authorized user is engaged with the electronic device; and responsive to determining that the authorized user is engaged with the device, maintaining access to the device by the authorized user without requiring additional authentication.

20. The method of claim 19, further comprising:

analyzing fourth reflections received from the authorized user;

determining, based on the analysis of the fourth reflections received from the authorized user, that the authorized user is not engaged with the electronic device; and responsive to determining that the authorized user is not engaged with the electronic device, ending access to the electronic device by the authorized user.

\* \* \* \* \*